United States Patent
Enokihara (10) Patent No.: US 7,016,272 B2
(45) Date of Patent: *Mar. 21, 2006

(54) OPTICAL DISK DEVICE WITH SLED DRIVE DECISION MEANS

(75) Inventor: Takashi Enokihara, Ibaraki (JP)

(73) Assignee: Sony Computer Entertainment Inc., Tokyo (JP)

( * ) Notice: Subject to any disclaimer, the term of this patent is extended or adjusted under 35 U.S.C. 154(b) by 439 days.

This patent is subject to a terminal disclaimer.

(21) Appl. No.: 10/044,852

(22) Filed: Nov. 7, 2001

(65) Prior Publication Data

US 2003/0012095 A1 Jan. 16, 2003

(30) Foreign Application Priority Data

Nov. 8, 2000 (JP) ............................. 2000-340253
Oct. 31, 2001 (JP) ............................. 2001-334809

(51) Int. Cl.
*G11B 7/00* (2006.01)

(52) U.S. Cl. .............................. 369/44.29; 369/44.28; 369/53.3

(58) Field of Classification Search ............ 369/30.16, 369/30.15, 53.3, 44.35, 44.32, 44.29, 44.27; G11B 7/00
See application file for complete search history.

(56) References Cited

U.S. PATENT DOCUMENTS

| 5,138,594 | A  | * | 8/1992  | Fennema et al. ........ 369/44.29 |
| 6,025,907 | A  |   | 2/2000  | Nakayama et al. |
| 6,044,050 | A  | * | 3/2000  | Kuroiwa .................. 369/44.41 |
| 6,563,772 | B1 | * | 5/2003  | Hong et al. .............. 369/44.26 |
| 6,633,520 | B1 | * | 10/2003 | Song ....................... 369/44.28 |
| 6,693,861 | B1 | * | 2/2004  | Lim ........................ 369/44.28 |
| 6,826,134 | B1 | * | 11/2004 | Enokihara ................ 369/44.29 |

FOREIGN PATENT DOCUMENTS

JP      11-195237      7/1999

* cited by examiner

*Primary Examiner*—A M Psitos
(74) *Attorney, Agent, or Firm*—Katten Muchin Rosenman LLP (57) ABSTRACT

Optical disk device, in which a tracking adjustment system and sled adjustment system are controlled independently, has offset value acquisition capability, which detects the tracking drive signals output from tracking adjustment system for one lap around optical disk and acquires multiple tracking drive offset values. Such device also has offset representative value computation capability, which computes an offset representative value from multiple tracking drive offset values, as well as an offset value comparison capability, which compares the offset center value in the state in which no tracking adjustment control is done, and the offset representative value, as well as a sled drive decision means capability, which decides the drive of sled adjustment system 36 based on the comparison result.

18 Claims, 6 Drawing Sheets

OPTICAL DISK DEVICE WITH SLED DRIVE DECISION MEANS

FIELD OF THE INVENTION

This invention concerns an optical disk device that has a tracking adjustment system that performs tracking adjustment of an optical pickup with respect to said optical disk in order to read-write information by focusing a light spot from an optical pickup onto the optical disk, a sled adjustment system that adjusts the sled position of said optical pickup, and a control means that controls these adjustment systems. This invention can be used in an optical disk device that regenerates information recorded on, for example, a CD, CD-ROM, DVD, or DVD-ROM and records/regenerates information with respect to a CD-R, CD-RW, DVD-R, or DVD-RW.

BACKGROUND OF THE INVENTION

Optical disk devices that play (or regenerate) information recorded on a CD, CD-ROM, DVD, DVD-ROM, etc., and optical disk devices that record/play information with respect to a CD-R, CD-RW, DVD-R, DVD-RW, etc. are known. These optical disk devices are constructed so as to record and/or play information by shining a light spot from an optical pickup onto the information recording surface of a mounted optical disk and detecting the reflected light. The relative position of the optical disk and optical pickup in such an optical disk device must be precisely adjusted, because the light spot must accurately shine onto the track on which the information on the optical disk is recorded.

Thus the optical disk device has a tracking adjustment system that performs tracking adjustment with respect to the mounted optical disk, a focus adjustment system that adjusts the focal point depth of the light spot with respect to the optical disk, and a sled adjustment system that adjusts the sled position of the optical pickup. These adjustment systems are driven and controlled by a control means based on an error signal detected by the optical pickup.

In such an optical disk device, in order to cause a track jump operation to be performed to move to the target track by jumping across multiple tracks all at once, first, by means of the tracking adjustment system, one adjusts the attitude of the object lens that constitutes the optical pickup while detecting the tracking error signal output from the optical pickup, and moves the center of the light spot to the target track. Next, in correspondence with this, a so-called traverse movement is executed by means of the sled adjustment system to bring the optical pickup to immediately below the target track.

Heretofore, such control of the tracking adjustment system and sled adjustment system was performed using an autosequencer inside a control digital signal processor (DSP) based on the tracking error signal output from the optical pickup. And this control was performed in such a way that the speed of the traverse is kept constant by making the tracking adjustment system and the sled adjustment system move in cooperation.

But there have been problems such as the following in conventional optical disk devices in which control is thus done so that the tracking adjustment system and sled adjustment system move in cooperation based on the tracking error signal. That is, there has been the problem that even if it is a tracking error signal that is caused by a disturbance such as eccentricity of the optical disk and a treatable tracking error signal occurs by position adjustment of the tracking adjustment system alone, operation control of the sled adjustment system may take place in response, and the sled adjustment system may react oversensitively.

In this case one could conceive of a method whereby, by passing the tracking signal through a low-pass filter, one causes the sled adjustment system not to operate for a tracking error signal that is below a prescribed threshold value, but if the sensitivity is set too high, one cannot prevent the sled adjustment system from reacting oversensitively, and if the sensitivity is set too low, it will be lacking in responsiveness during sled position adjustment. Therefore this method will not provide an adequate solution.

SUMMARY OF THE INVENTION

It is an object of the present invention to provide an optical disk device in which it is possible to overcome above-mentioned problem.

The optical disk device of this invention accomplishes said objective by independently controlling the sled adjustment system and tracking adjustment system, detecting the tracking drive signal output from the tracking adjustment system for one lap around the mounted optical disk, ascertaining the optical disk eccentricity or other disturbance from this tracking drive signal, and adjusting the sled adjustment system based thereon.

Specifically, the optical disk device of this invention, which has a tracking adjustment system that, by shining a light spot from an optical pickup onto an optical disk, performs tracking adjustment of said optical pickup with respect to said optical disk in order to record and/or play information, a sled adjustment system that adjusts the sled position of said optical pickup and a control means that controls these adjustment systems, is characterized in that said sled adjustment system and said tracking adjustment system are controlled independently.

Said disk device also has an offset value acquisition means that detects at prescribed intervals the tracking drive signal for driving that is output from said tracking adjustment system and acquires signal values as tracking drive offset values, an offset representative value computation means that computes an offset representative value based on the tracking drive offset values around one lap of said optical disk that are acquired by this offset value acquisition means, an offset value comparison means that compares the offset center value, which is the tracking drive offset value in the state in which no tracking adjustment control is done, and the offset representative value computed by said offset representative value computation means and a sled drive decision means that decides, based on the comparison result by this offset value comparison means, whether to drive said sled adjustment system.

In this case, the offset center value is the tracking offset value in the state in which no tracking adjustment control is done, i.e., the tracking offset value with the tracking adjustment system in the neutral state (the state in which the objective lens is in the center position in the range of adjustment by the tracking adjustment system). Also, it is desirable that the offset value acquisition means have a rotation drive signal monitoring unit that monitors the rotation drive signal, specifically, the Frequency Generator (FG) signal, that is output from the rotation adjustment system of the spindle motor that rotates the mounted optical disk. Moreover, it is desirable that computation of the offset representative value be performed by taking the average of the multiple tracking drive offset values acquired by the offset value acquisition means.

With an embodiment of the invention as thus described, an offset representative value is computed by the offset representative value computation means based on tracking drive offset values for one lap around the optical disk that are acquired by the offset value acquisition means, and by the offset value comparison means and the sled drive decision means, this offset representative value and the offset center value are compared and it is decided whether to drive the sled adjustment system. Therefore, because the eccentricity of the optical disk that appears can be ascertained as a deviation from the offset center value, sled adjustment can be done while being affected almost not at all by the eccentricity component of the optical disk. And because the tracking adjustment system and the sled adjustment system are controlled independently, the sled adjustment system can be prevented from reacting oversensitively in association with the tracking adjustment.

And because the tracking offset values around one lap can be acquired based on the FG signal of the rotation adjustment system by letting the offset value acquisition means have a rotation drive signal monitoring unit, sled position adjustment of the optical pickup by the sled adjustment system can be performed without considering the rotation speed of the optical disk. Moreover, because the offset representative value is computed by averaging the tracking drive offset values around one lap of the optical disk, an offset representative value based on the eccentricity of the optical disk as a whole can be obtained, and a more appropriate comparison decision can be made when judging the comparison with the offset center value.

In the foregoing, it is desirable that the above-described offset drive decision means decide whether to drive the sled adjustment system based on the larger-smaller relationship between the offset representative value and the offset center value, and the difference between the two. Here, the larger-smaller relationship between the offset representative value and the offset center value can be used as a parameter to judge the direction of tilt, with respect to the optical disk, of the objective lens that comprises the optical pickup in the tracking adjustment system, and the difference between the two can be used as a parameter for calculating the drive amount of the sled adjustment system.

Thus, because the bias of the tracking adjustment system during sled adjustment can be ascertained by making a drive decision by the sled drive decision means based on the larger-smaller relationship between the offset representative value and the offset center value and the difference between them, it will be possible to do sled adjustment only if the field of view narrows and to drive the sled adjustment system only in the case of necessity. In addition, because the extent of the bias of the tracking adjustment system can be understood from ascertaining the difference between the two, if the drive amount of the sled adjustment system is set based on this difference, sufficient sled adjustment for correcting the tilt of the objective lens can be done, and the field of view of the optical pickup can be ensured.

Also, it is desirable that the above-described offset value acquisition means, offset representative value computation means, offset value comparison means, and sled drive decision means be constituted as software expanded in a microcomputer that includes a control means. By thus constituting each means as software expanded in a microcomputer, it is no longer necessary to build into the optical disk device a DSP, etc. especially for sled adjustment, thereby reducing the manufacturing cost of the optical disk device and making it possible to change the control method simply, just by replacing the software when the sled adjustment control method is to be changed.

Also, in the optical disk device of this invention, which has a tracking adjustment system that, by shining a light spot from an optical pickup onto an optical disk, performs tracking adjustment of said optical pickup with respect to said optical disk in order to record and/or play information, a sled adjustment system that adjusts the sled position of said optical pickup and a control means that controls these adjustment systems, said sled adjustment system and said tracking adjustment system are controlled independently. Said device also has a means that detects at prescribed intervals the tracking drive signal for driving that is output from said tracking adjustment system and a means that drives said sled adjustment system based on the values of said detected tracking drive signals.

DETAILED DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 1:
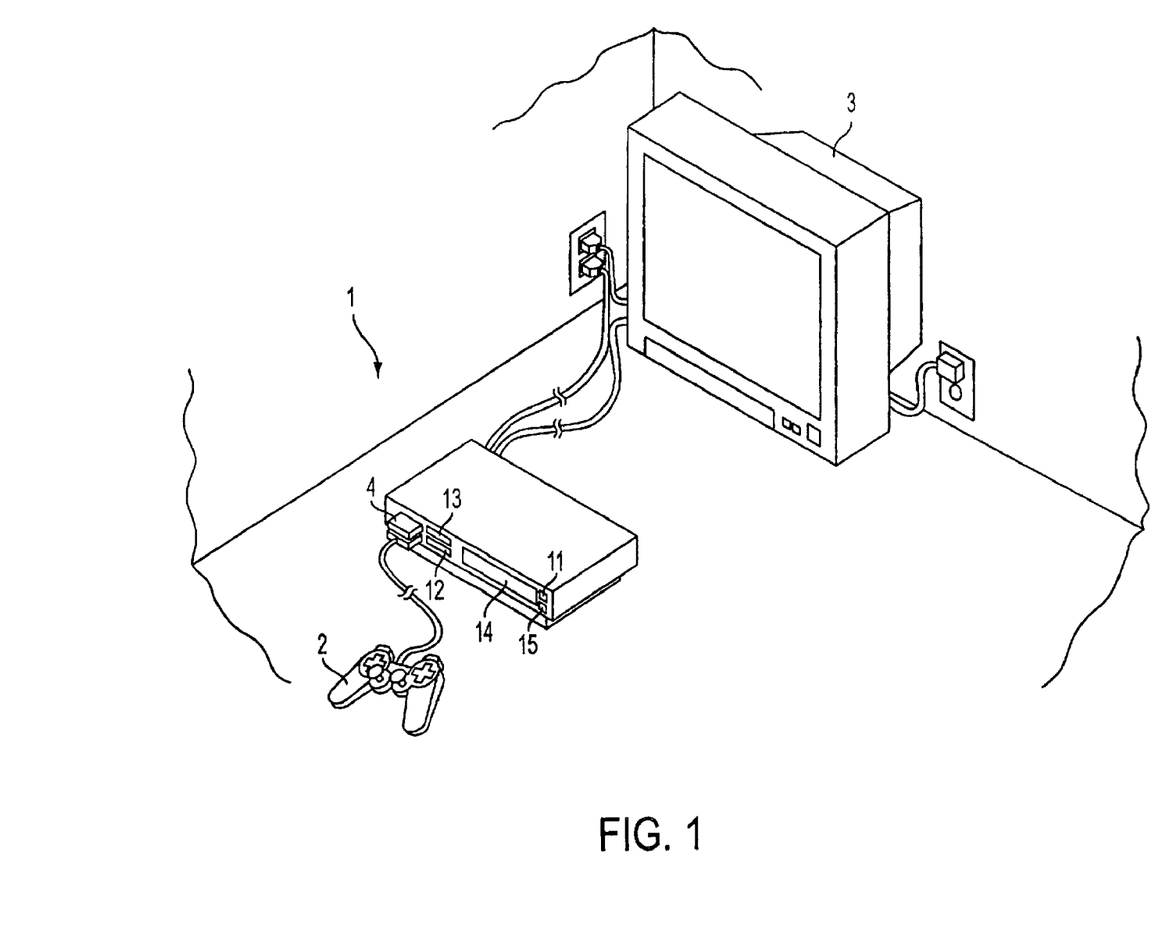
FIG. 1 is a rough perspective view of an entertainment device relating to an embodiment of the present invention.

FIG. 1 shows entertainment device 1 on which is mounted an optical disk device relating to an embodiment of the present invention. Such entertainment device 1 is for regenerating and executing a game program, etc. recorded on a CD (compact disc), CD-ROM, DVD (digital versatile (video) disk), DVD-ROM, or other optical disk (or discal recording medium). Instructions from the user during program execution are given by the user operating the operation controller 2. The output unit of said entertainment device 1 is connected to a television receiver or other display device 3, and the image generated by execution of the program is displayed on this display device 3.

The power to entertainment device 1 is supplied by the commercial public power source supplied to general homes. Entertainment device 1 starts by turning on a master switch (not pictured) on the back of the device and pressing power switch 11 on the front of the device. This power switch 11 functions as a reset button when it is pressed during operation of entertainment device 1.

Provided on the front of entertainment device 1 are controller slot 12 and card slot 13. Operation controller 2 is connected to controller slot 12, and memory card 4 is connected to card slot 13. Provided on the front of the device, next to controller slot 12 and card slot 13, is optical disk device (or optical disk driver) 14. This optical disk device 14 is a disk loading type optical disk device that is constructed in such a way that operating operation switch 15 causes the disk tray to advance and retract from entertainment device 1.

Figure 2:
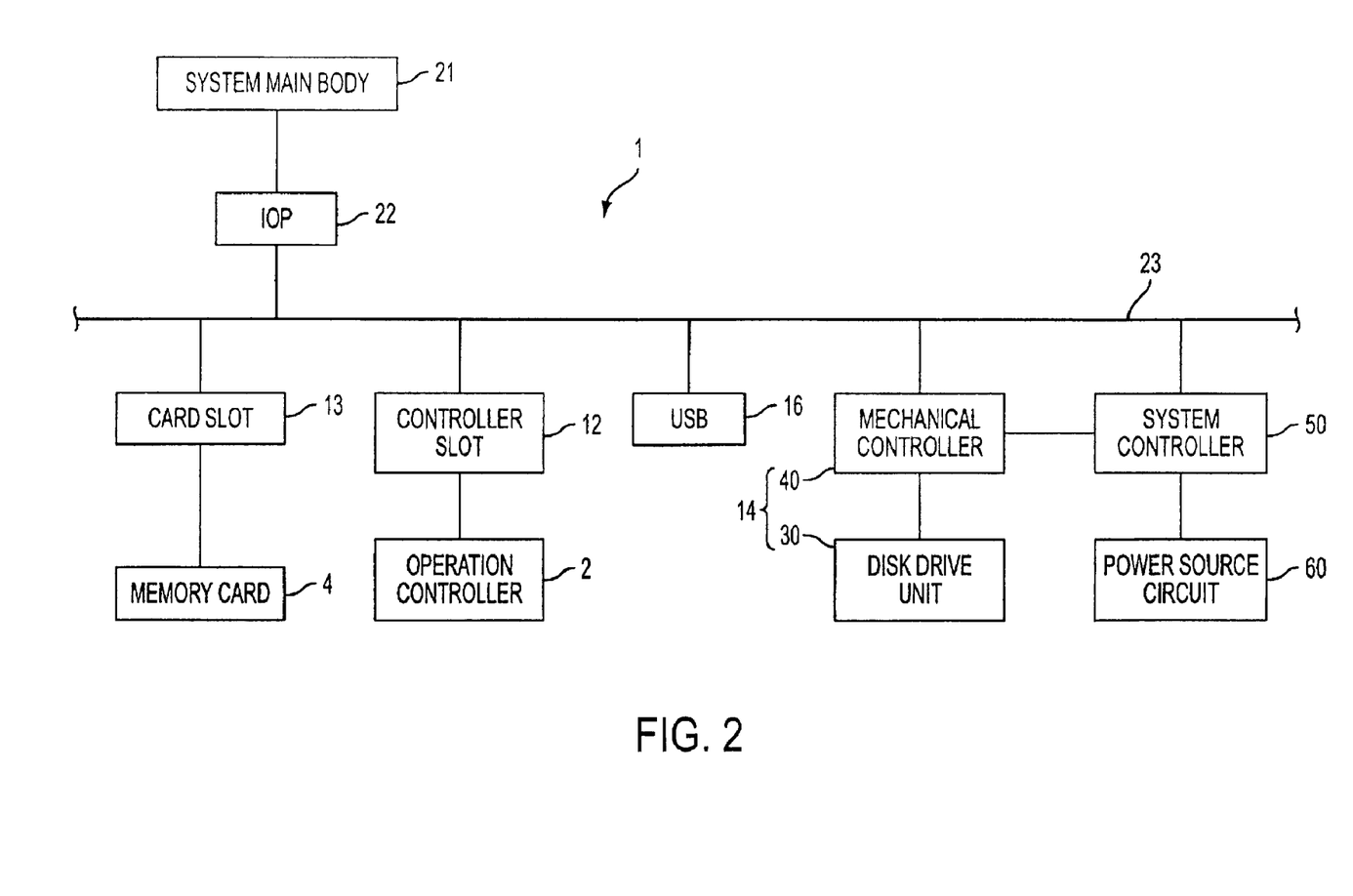
FIG. 2 is a block diagram showing the internal structure of the entertainment device of said embodiment.

As shown in FIG. 2, the main body of the device inside entertainment device 1 has system main body 21 as the main board on which a CPU (central processing unit) is mounted, and I/O port 22, which is connected to said system main body 21. Connected to I/O port 22, via bus line 23, are controller slot 12, card slot 13, USB port 16, etc., as well as mechanical controller 40 and system controller 50. System main body 21 computationally processes software for control of the device as a whole as well as game programs, etc. This system main body 21 performs operation control of operation controller 2 and other external devices connected via I/O port 22 to controller slot 12, card slot 13, USB port 16, etc., as well as operation control of mechanical controller 40 and system controller 50. System main body 21 also processes signals output from external devices, etc. connected to I/O port 22.

As shown in FIG. 2, optical disk device 14, which is also shown in FIG. 1, has disk drive unit 30 and mechanical controller 40. Mechanical controller 40 performs operation control of disk drive unit 30, as will be described below in greater detail. Disk drive unit 30 is connected to bus line 23 via this mechanical controller 40. System controller 50 controls power circuit 60 and manages the state of the supply of power in entertainment device 1 as a whole based on signals from power switch 11 and sensors (not pictured) that monitor the temperature state of the CPU that constitutes system main body 21. Power circuit 60 is connected to bus line 23 via this system controller 50.

Mechanical controller 40 and system controller 50 are constituted with a direct port connection, not via bus line 23, between them whereby, according to the operation signal of power switch 11, system controller 50 outputs a Low/High two-level signal to mechanical controller 40. If, for example, power switch 11 is pressed at initial startup, it outputs a Low, and it outputs a High if during operation of entertainment device 1 power switch 11 is pressed and a restart command is given.

Figure 3:
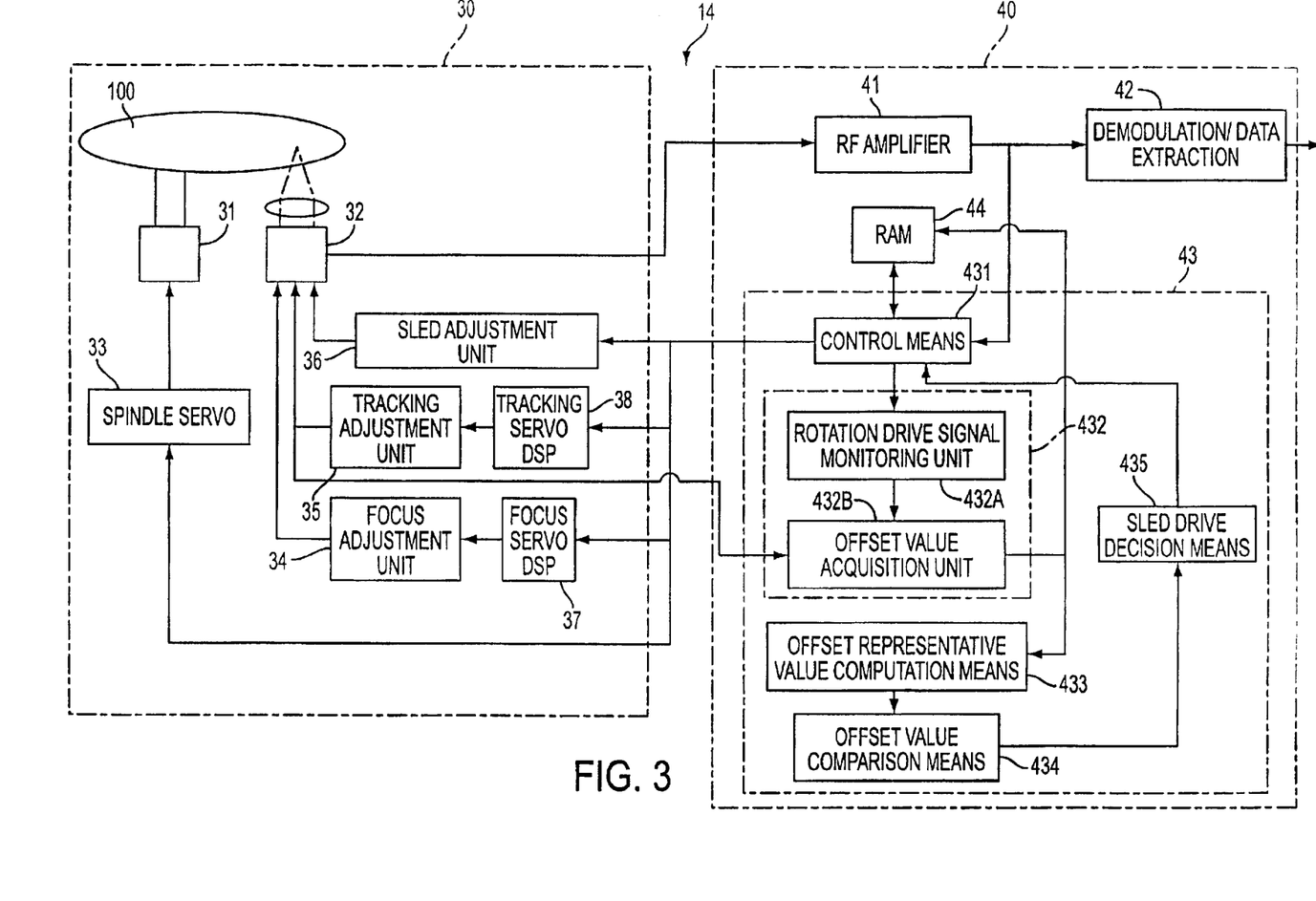
FIG. 3 is a block diagram showing the structure of the disk drive unit of the invention, and the mechanical controller that controls said disk drive unit.

As shown in FIG. 3, disk drive unit 30 has spindle motor 31 and optical pickup 32, spindle servo unit 33, focus adjustment unit 34, tracking adjustment unit 35, sled adjustment unit 36, focus servo DSP 37 and tracking, servo DSP 38. Also, although not pictured in FIG. 3, provided on disk drive unit 30 are a skew adjustment unit that adjusts the tilt position of optical pickup 32 with respect to optical disk 100, a disk loading mechanism for extending and retracting the disk tray from entertainment device 1, and a raising and lowering mechanism that raises and lowers spindle motor 31 and optical pickup 32 so that they do not interfere with the disk tray when this disk tray is extended and retracted.

Spindle motor 31 rotates optical disk 100 mounted on the disk tray and provided on the rotation shaft end of said spindle motor 31 is a chucking member that engages with the center hole in optical disk 100. This spindle motor 31 is rotationally controlled by spindle servo unit 33 so that information can be detected by optical pickup 32 regardless of any differences in the radial-direction position of optical pickup 32 with respect to optical disk 100.

Said focus adjustment unit 34 performs position adjustment of optical pickup 32 so that the focal point depth of the light (or laser beam) spot shined (or emitted) from optical pickup 32 remains constant with respect to the recording layer (information recording surface or surface for recording/reading) of optical disk 100. This focus adjustment unit 34 has an advance-and-retract mechanism that adjusts position of optical pickup 32 toward/away from the information recording layer of optical disk 100, an actuator that is the drive source for this advance-and-retract mechanism, as well as a driver that drives it. The control signals output from control means 431 of below-described control unit 43 are input into this actuator via focus servo DSP 37, and drive control of focus adjustment unit 34 is performed. That is, focus adjustment unit 34 and focus servo DSP 37 constitute the focus adjustment system.

Said tracking adjustment unit 35 has a two-axis device that performs adjustment of the objective lens that constitutes optical pickup 32 so that the light spot from optical pickup 32 shines (or focuses) accurately onto the tracks of optical disk 100, an actuator that provides driving power to this two-axis device and a driver that drives it. As in the case of focus adjustment unit 34, control instructions output from control means 431 are input into the actuator via tracking servo DSP 38, and drive control of tracking adjustment unit 35 is performed. That is, tracking adjustment unit 35 and tracking servo DSP 38 constitute the tracking adjustment system.

Said sled adjustment unit 36 adjusts position of optical pickup 32 in the radial direction of optical disk 100 by track jumps, etc. Although not pictured, said sled adjustment unit 36 has a sled feed mechanism that consists of a rack that extends along the radial direction of optical disk 100 and a toothed wheel that engages with this rack, a stepping motor that causes this toothed wheel to rotate, and a driver IC for driving the motor. Optical pickup 32 is attached on the rack, and when the toothed wheel turns by driving the stepping motor, the rack causes optical pickup 32 to move along the radial direction of optical disk 100. Sled adjustment unit 36 and control means 431 of control unit 43 are connected without going through a DSP.

Mechanical controller 40 has RF amplifier 41, demodulation/data extraction unit 42, control unit 43, and RAM (random access memory) 44. Although not pictured, mechanical controller 40 is connected to an E2PROM (EEPROM: Electrically Erasable Programmable Read Only Memory) which is mounted on a circuit board that includes said mechanical controller 40. RF amplifier 41 amplifies the RF signal output from optical pickup 32 of disk drive unit 30 and outputs it to demodulation/data extraction unit 42. Demodulation/data extraction unit 42 demodulates this RF signal and extracts the necessary data. As shown in FIG. 2, the extracted data is output to system main unit 21 via bus line 23 and I/O port 22 and is processed by said system main unit 21.

As shown in FIG. 3, control unit 43 outputs control instructions to spindle servo unit 33, focus adjustment unit 34, tracking adjustment unit 35, and sled adjustment unit 36, which constitute disk drive unit 30 This control unit 43 has control means 431, which generates control instructions to these adjustment units 33–36, offset value acquisition means 432 for generating control instructions to sled adjustment unit 36, offset representative value computation means 433, offset value comparison means 434, and sled drive decision means 435. These means 431–435 are constituted as software that is executed by a microcomputer that constitutes control unit 43. Of course, each means 431–435 can be constituted as a unit of electronic circuit.

Although not pictured, said control means 431 is functionally divided into spindle rotation control (rotation adjustment system), tracking drive control, focus drive control, and sled drive control. This control means 431 acquires a tracking error signal and focus error signal output from RF amplifier 41, and, based on these signal, controls focus adjustment unit 34 and tracking adjustment unit 35. With respect to sled adjustment unit 36, control based on the tracking error signal is not done.

Said offset value acquisition means 432 detects multiple times, at prescribed intervals, the tracking drive signal (or signal for tracking drive) for one lap of mounted optical disk 100 and acquires the signal values (i.e., values of the signal) as tracking drive offset values. The offset value acquisition means 432 also has rotation drive signal monitoring unit 432A and offset value acquisition unit 432B. Rotation drive signal monitoring unit 432A detects the FG signal for the rotation drive of spindle motor 31 output from control means 431. Specifically, the Rotation drive signal monitoring unit 432A detects the pulse edges of the rising and falling parts of one pulse in an FG signal as shown in the graph in FIG. 4 and outputs to offset value acquisition unit 432B the fact that it detected them. Offset value acquisition unit 432B detects the tracking drive signals output from tracking adjustment unit 35 based on the pulse edges detected by said rotation drive signal monitoring unit 432A and acquires the tracking drive offset signals.

Acquisition of the offset values (it will be explained in greater detail below) is done for example as follows: it is begun by taking as the trigger the rising pulse edge detected by rotation drive signal monitoring unit 432A, and tracking drive offset values are acquired multiple times at prescribed intervals until rotation drive signal monitoring unit 432A detects the falling pulse edge. The tracking drive offset values acquired each time are stored in a microcomputer register, that is part of control unit 43, along with a counter value denoting the number of times acquired, and they are added together. When the falling pulse edge is detected, the tracking drive offset value accumulated in the register is divided by the counter value to calculate the average value as the tracking drive offset value in a single pulse drive such as P1 shown in FIG. 4, and its value is recorded in RAM 44.

Figure 4:
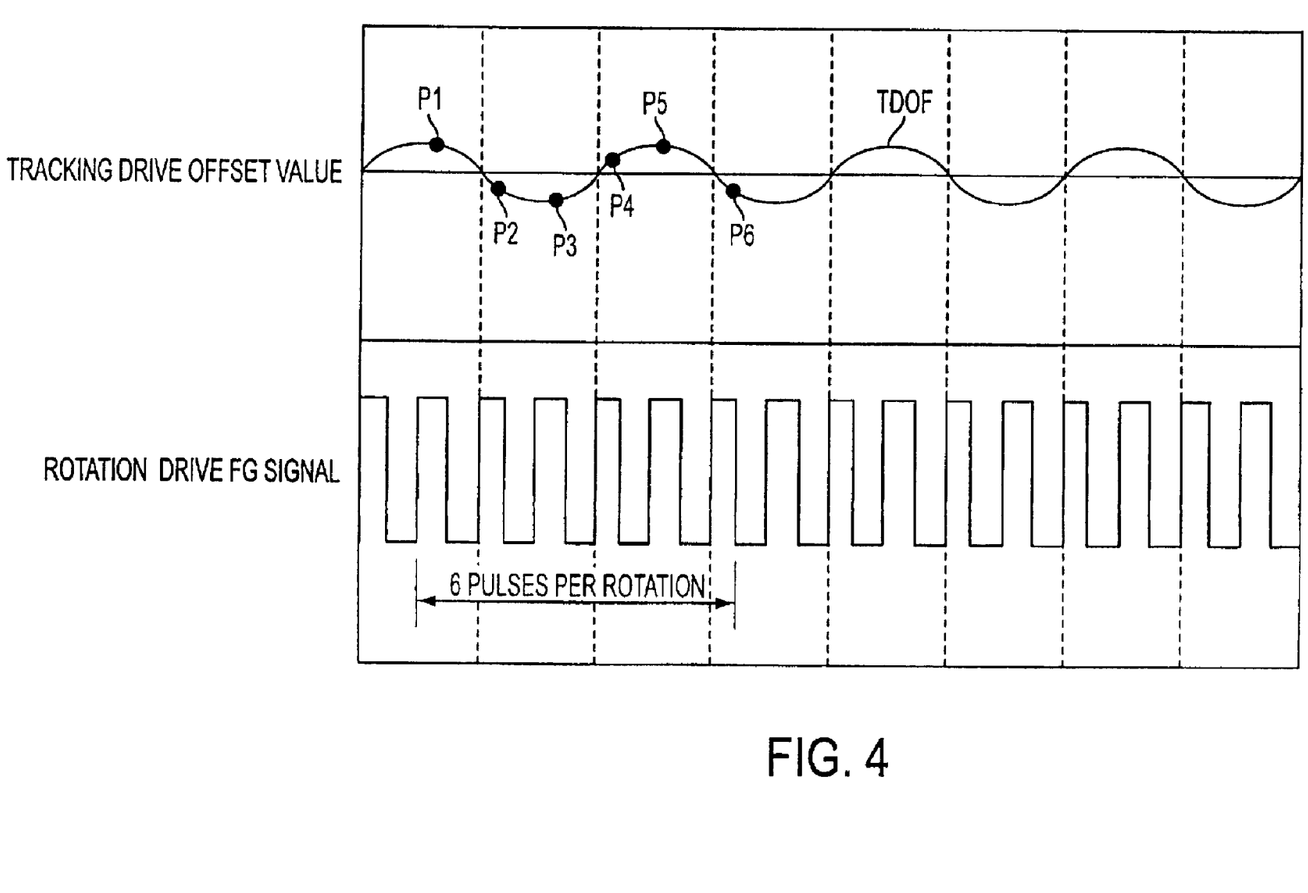
FIG. 4 is a graph showing the rotation drive signal and tracking drive offset value acquired by the offset value acquisition means of said embodiment.

Acquisition of tracking drive offset values is done for one rotation of optical disk 100. As shown in FIG. 4, assuming that optical disk 100 makes one rotation by six pulses of the FG signal, acquisition of the tracking drive offset value is done six times, and the six tracking drive offset values at points P1–P6 are recorded in RAM 44.

Said offset representative value computation means 433 in FIG. 3 is the part that computes the offset representative value based on the tracking drive offset values (points P1–P6) for one rotation of optical disk 100 that are acquired by offset value acquisition means 432 and are recorded in RAM 44. Computation of the representative value is executed by the following formula (1), wherein TDOF1–TDOF6 are the tracking drive offset values at points P1–P6 shown in FIG. 4. The denominator in formula (1) is the number of data points of tracking drive offset values added up in the numerator, i.e. The value of the denominator changes according to the number of tracking drive offset values recorded in RAM 44.

$$(\text{Offset representative value}) = (TDOF1+TDOF2+\ldots+TDOF6)/6 \quad (1)$$

Said offset value comparison means 434 in FIG. 3 compares the offset center value recorded in said EEPROM and the offset representative value calculated by offset representative value computation means 433 according to formula (1). The offset center value, which is a prescribed standard value, can be obtained by measuring beforehand the tracking drive offset value in a state in which no tracking adjustment is performed, that is, in a state in which the two-axis device of tracking adjustment unit 35 is neutral. This offset center value can be used suitably for sled adjustment by loading it into RAM 44 from the EEPROM at the startup of entertainment device 1.

From the larger-smaller relationship between the offset representative value and the offset center value, this offset value comparison means 434 sets whether to move the sled position radially outward on optical disk 100 (the Fwd direction), or whether to move it radially inward (the Rev direction).

If the result of the comparison in the larger-smaller relationship is that the offset representative value is greater than or equal to the offset center value (offset representative value>=offset center value), it is decided that because of the eccentricity of optical disk 100 there is a tendency for the objective lens that constitutes optical pickup 32 to be oriented in the Fwd direction, so the setting is made so as to move optical pickup 32 in the Fwd direction in order that the field of view of optical pickup 32 in said Fwd direction does not become narrow.

Conversely, if the offset representative value is less than the offset center value (offset representative value<offset center value), the field of view of optical pickup 32 in the Rev direction will easily become narrow, so to prevent this, the setting is made so as to move the optical pickup 32 in the Rev direction.

When setting of the drive direction ends, offset value comparison means 434 computes the difference between the offset representative value and the offset center value and outputs the drive direction and this difference to sled drive decision means 435.

Said sled drive decision means 435 decides, based on the comparison result output from offset value comparison means 434, whether to drive sled adjustment unit 36. This sled drive decision means 435 decides whether to perform sled drive based on whether the difference between the offset representative value and the offset center value output from offset value comparison means 434 is within a prescribed threshold value Specifically, if said difference is within the threshold value, the decision means 435 decides not to perform sled drive, and if the difference exceeds the threshold value, the decision means 435 decides that the sled should be driven.

If it is decided that the sled should be driven, then sled drive decision means 435 calculates the sled drive adjustment amount based on said difference and outputs information relating to the drive direction and drive adjustment amount to control means 431. The threshold value for making said drive decision can be arbitrarily set in a range in which the sled drive does not react oversensitively and responsiveness can be secured.

Figure 5:
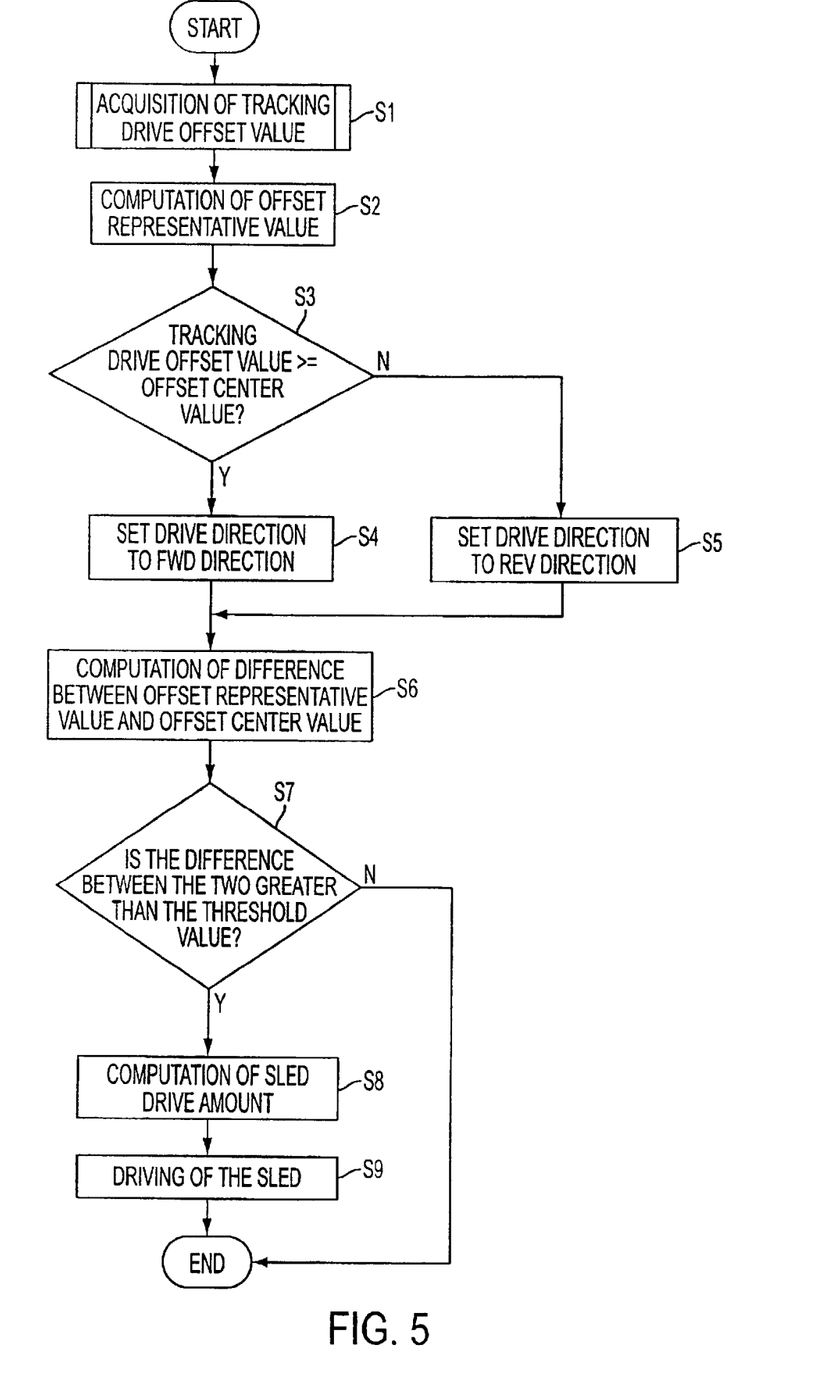
FIG. 5 is a flowchart showing the sled adjustment procedure of the optical pickup of said embodiment.

Next is described, based on the flowchart shown in FIG. 5, the procedure for sled position control of optical pickup 32 in an optical disk device constituted as described above.

(1) When the user operates operation controller 2 to read out the information in a prescribed track position of optical disk 100 and outputs an operation signal to system main body 21, based on this, system main body 21 generates an instruction to move sled adjustment unit 36. This instruction is input into mechanical controller 40 via I/O port 22.

Figure 6:
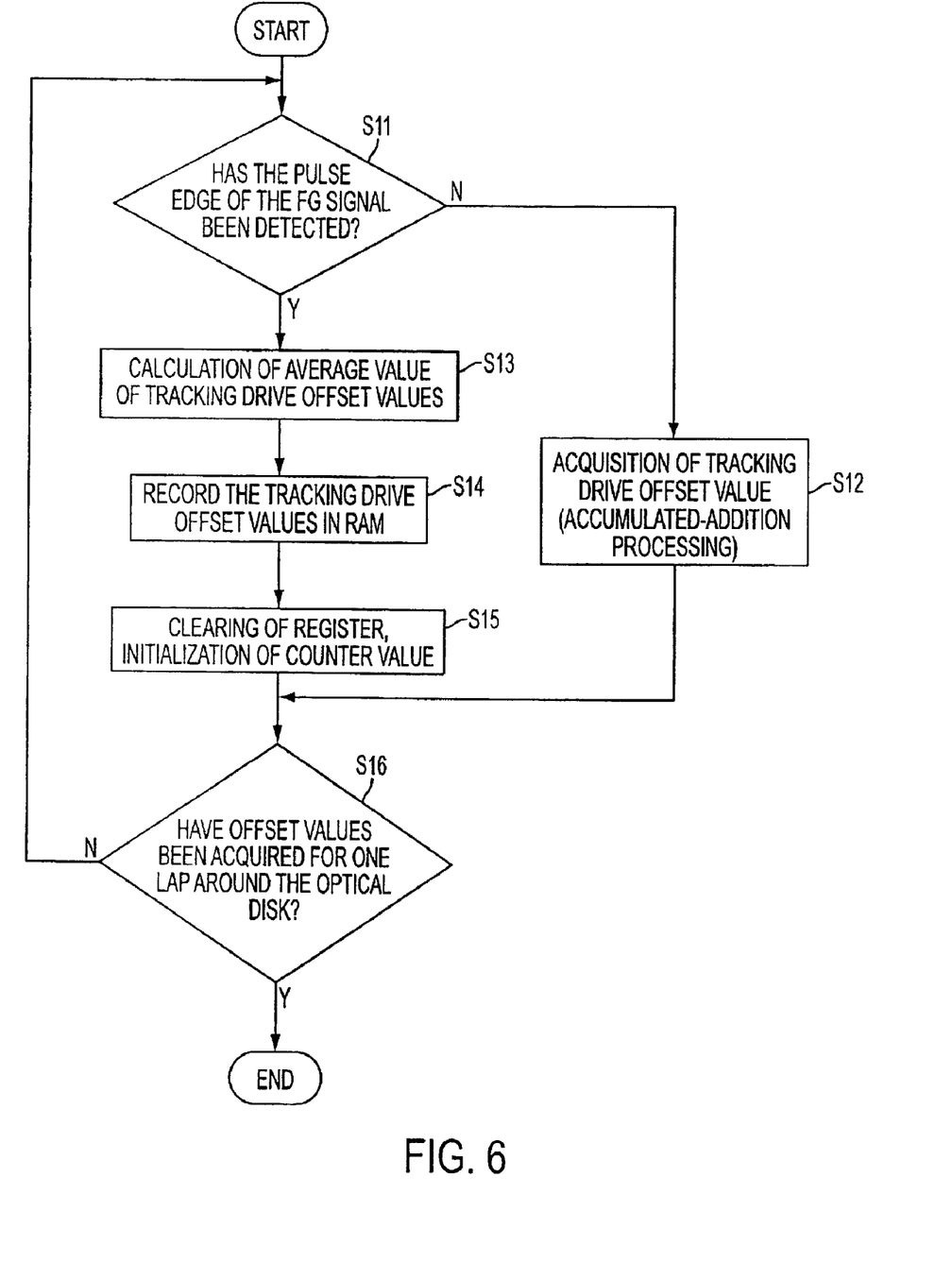
FIG. 6 is a flowchart showing the sled adjustment procedure of the optical pickup of said embodiment.

(2) Control means 431 into which this instruction is input generates and outputs to offset value acquisition means 432 a command to acquire a tracking drive offset value, and based on this command, offset value acquisition means 432 begins acquisition of tracking drive offset values (processing S1). This processing S1 is done based on the flowchart shown in FIG. 6.

(2-1) If the falling pulse edge in graph FG in FIG. 4 is not detected by rotation drive signal monitoring unit 432A (processing S11), then offset value acquisition unit 432B performs acquisition of tracking drive offset values as shown by graph TDOF (processing S12). The offset value acquisition unit 432B waits for the rising pulse edge to be detected by rotation drive signal monitoring unit 432A, and begins the processing S12.

(2-2) Acquisition of tracking drive offset values is done repeatedly until rotation drive signal monitoring unit 432A next detects a falling pulse edge of graph FG. The multiple tracking drive offset values that have been acquired are stored in a register by accumulation processing, in which the second tracking drive offset value is added to the first tracking drive offset value. Stored in the register together with this accumulated value is the number of accumulations, i.e., a counter value that denotes the number of times the offset value has been acquired.

(2-3) In the above repetition, when rotation drive signal monitoring unit 432A detects a falling pulse edge in the FG signal, offset value acquisition unit 432B divides the accumulated value of the tracking drive offset values stored in the register by the counter value and calculates as the average the tracking drive offset value of the first pulse, that is, the offset value at point P1 (processing S13). This tracking drive offset value TDOF1 at point P1 is recorded in RAM 44 (processing S14), then the accumulated value recorded in the register is cleared and the counter value is initialized (processing S15).

(2-4) When rotation drive signal monitoring unit 432A again detects a rising pulse edge, tracking drive offset value TDOF2 at point P2 is acquired by the same procedure as in (2-1) through (2-3) and the offset value is recorded in RAM 44. This acquiring and recording process is repeated for points P3, . . . P4. Processing by offset value acquisition unit 432B is terminated when tracking drive offset values TDOF1–TDOF6 at points P1–P6 have been acquired and tracking drive offset values for an entire lap around optical disk 100 have been acquired (processing S16).

(3) When acquisition of tracking drive offset values by offset value acquisition means 432 ends, offset representative value computation means 433 loads the tracking drive offset values acquired for one lap around optical disk 100 that have been recorded in RAM 44 and performs offset representative value computation processing (processing S2). In this embodiment, as shown in FIG. 4, the average is calculated by formula (1) for the tracking drive offset values at the six points P1–P6 and is taken as the offset representative value. When the offset representative value has been obtained, offset representative value computation means 433 outputs this offset representative value to offset value comparison means 434.

(4) Offset value comparison means 434 call out the offset center value loaded in RAM 44 and makes a comparison between this center value and the offset representative value output from offset representative value computation means 433 (processing S3). If the result of the comparison is that the offset representative value is greater than or equal to (>=) the offset center value, the drive direction of sled adjustment unit 36 is set to the Fwd (forward) direction (processing S4). On the other hand, if the offset representative value is less than (<) the offset center value, the drive direction of sled adjustment unit 36 is set to the Rev (reverse) direction (processing S5).

(5) Offset value comparison means 434 calculates the difference between the offset representative value and the offset center value (processing S6) and outputs the result, along with the drive direction, to sled drive decision means 435.

(6) Sled drive decision means 435 compares the difference in offset values from offset value comparison means 434 with a prescribed threshold value and decides whether to perform sled drive (processing S7). If the difference is less than the prescribed threshold value, sled drive decision means 435 decides that the field of view of optical pickup 32 is adequately secured and is within the allowable range, and terminates processing without outputting to control means 431 information that sled drive should be performed.

(7) If, on the other hand, it is decided that said difference is greater than the prescribed threshold value, sled drive decision means 435 decides that the field of view of optical pickup 32 has become narrow, and based on the above difference computes the sled drive amount for performing sled drive (processing S8). Based on the state of tilt of the objective lens of optical pickup 32 (or tilt of laser path), caused by tracking adjustment unit 35, obtained from the above difference, the sled drive amount is calculated as the drive amount to restore this state of tilt to the neutral position.

(8) Sled drive decision means 435 outputs to control means 431 the calculated sled drive amount and information concerning the sled drive direction. Control means 431, which receives this output, generates, and outputs to sled adjustment unit 36, a control instruction to perform drive of the sled according to the obtained sled drive amount and drive direction. In accordance with this control instruction, sled adjustment unit 36 adjusts the sled position of optical pickup 32 (processing S9).

The above-described embodiment has the following effects.

In the presently described embodiment, the offset representative value is computed by offset representative value computation means 433 based on tracking drive offset values TDOF1–TDOF6 for one lap around optical disk 100 acquired by offset value acquisition means 432. Then, by comparing this offset representative value and the offset center value, it is decided whether to drive the sled adjustment system, by offset value comparison means 434 and sled drive decision means 435. Therefore, because it is possible to ascertain the eccentricity of optical disk 100 that appears as deviation from the offset center value, sled adjustment can be done almost entirely unaffected by the eccentricity component of optical disk 100.

Furthermore, because tracking adjustment unit 35 and sled adjustment unit 36 are controlled independently, sled adjustment unit 36 can be prevented from reacting oversensitively in association with the tracking adjustment.

In addition, because offset value acquisition means 432 has rotation drive signal monitoring unit 432A, the tracking drive offset values for one lap can be acquired based on the FG signal for the spindle servo. Because of this, sled position adjustment of optical pickup 32 by sled adjustment unit 36 can be performed without considering the rotation speed of optical disk 100.

In addition, because the offset representative value is computed by averaging the tracking drive offset values of one lap around optical disk 100, the offset representative value that is based on the eccentricity of the whole optical disk 100 can be obtained, and as a result, a more appropriate comparison decision of the offset representative value with the offset center value can be made.

In addition, by making the decision on drive by sled drive decision means 435 based on the larger-smaller relationship between the offset representative value and the offset center value and the difference between the two, it is possible to ascertain the deviation of the tilt of optical pickup 32 due to tracking adjustment unit 35 at the time of sled adjustment. This makes it possible to do sled adjustment only if the field of view narrows and to perform the drive of sled adjustment unit 36 only when it is necessary.

Furthermore, because the extent of the bias of tracking adjustment unit 35 can be understood by ascertaining the difference between said two (the offset representative value and the offset center value), it is possible, by setting the drive amount of the sled adjustment system based on this difference, to do sufficient sled adjustment for correcting the tilt of the objective lens, and as a result, the field of view of optical pickup 32 can be ensured.

Also, by the fact that offset value acquisition means 432, offset representative value computation means 433, offset value comparison means 434, and sled drive decision means 435 are constituted as software executed in a microcomputer that constitutes control means 43, it is no longer necessary to build into optical disk device 14 a DSP, etc. especially for sled adjustment, thereby making it possible to reduce the manufacturing cost of the optical disk device 14. In addition, by constituting means 432–435 as software, it is possible to change the control method simply, just by replacing the software when the sled adjustment control method is to be changed.

This invention is not limited to the above embodiment; it also includes variants such as, but not limited to the following.

In the above embodiment, optical disk device 14 is built into entertainment device 1, but it is not limited to this. That is, the same effects described for the above embodiment can be enjoyed even if this invention is used in an optical disk device built into a personal computer or in an independent optical disk device Also, in the above embodiment, the average value of multiple tracking drive offset values was adopted as the offset representative value computed by offset representative value computation means 433, but it is not limited to this. It may be constituted so as to compute the offset representative value by adopting various representative values obtained by so-called statistical techniques.

Also, for the specific structure and shape, etc. when implementing this invention, other structures, etc. may be adopted as long as they achieve the purpose of this invention.

As described above, with the optical disk device of the embodiment of this invention, because the decision of whether to perform sled drive is made based on tracking drive offset values of one lap around the optical disk and an offset center value, it has the effect of making it possible to do sled adjustment unaffected by the optical disk's eccentricity, etc.

While the present invention has been described at some length and with some particularity with respect to the described embodiment, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

What is claimed is:

1. An optical disk device for writing on and/or reading from an optical disk information by focusing a light spot from an optical pickup onto the optical disk, said optical disk device comprising:
    a tracking adjustment system that performs tracking adjustment of said optical pickup with respect to said optical disk;
    a sled adjustment system that adjusts a sled position of said optical pickup; and
    a control means that controls said tracking and sled adjustment systems,
    wherein said sled adjustment system and said tracking adjustment system are controlled independently, and
    wherein said disk device further comprises:
    an offset value acquisition means that detects at prescribed intervals a tracking drive signal output from said tracking adjustment system and acquires signal values of the tracking drive signal as tracking drive offset values;
    an offset representative value computation means that computes an offset representative value based on multiple tracking drive offset values for one lap of said optical disk that are acquired by said offset value acquisition means;
    an offset value comparison means that compares an offset center value, which is the tracking drive offset value in the state in which no tracking adjustment control is performed, and the offset representative value computed by said offset representative value computation means; and
    a sled drive decision means that decides, based on the comparison result by said offset value comparison means, whether to drive said sled adjustment system.

2. An optical disk device according to claim 1, further comprising:
    a rotation adjustment system that performs rotation adjustment of a spindle motor that rotates the optical disk; and
    wherein said offset value acquisition means has a rotation drive signal monitoring unit that monitors the rotation drive signal output from said rotation adjustment system.

3. An optical disk device according to claim 1, wherein said offset representative value computation means computes the offset representative value by adding up multiple tracking drive offset values obtained by said offset value acquisition means and averaging the values that added up.

4. An optical disk device according to claim 3, wherein said sled drive decision means decides whether to drive said sled adjustment system based on a larger-smaller relationship between said offset representative value and said offset center value, and the difference between said offset representative value and said offset center value.

5. An optical disk device according to claim 1, wherein said offset value acquisition means, said offset representative value computation means, said offset value comparison means, and said sled drive decision means are constituted as software executed in a microcomputer that includes said control means.

6. An optical disk device for writing on and/or reading from an optical disk information by focusing a light spot from an optical pickup onto the optical disk, said optical disk device comprising:
- a tracking adjustment system that performs tracking adjustment of said optical pickup with respect to said optical disk;
- a sled adjustment system that adjusts a sled position of said optical pickup; and
- a control unit that controls said tracking and sled adjustment systems,
- wherein said sled adjustment system and said tracking adjustment system are controlled independently, and
- wherein said disk device further comprising:
- a unit that detects at prescribed intervals the tracking drive signal output from said tracking adjustment system; and
- a unit that drives said sled adjustment system based on the value of said detected tracking drive signal.

7. An optical disk device according to claim 6, wherein the unit that drives said sled adjustment system further comprises:
- a unit that determines an average value of said tracking drive signal values;
- a unit that determines a difference value between said average value and a prescribed standard value; and
- a unit that determines, according to said difference value, at least one of the amount and/or direction to move said sled adjustment system.

8. An optical disk device according to claim 6, wherein the unit that drives said sled adjustment system further comprises:
- a unit that determines an average value of said tracking drive signal values;
- a unit that determines a difference value between said average value and a prescribed standard value; and
- a unit that determines, according to said difference value, whether to move said sled adjustment system.

9. An optical disk device according to claim 6, wherein the unit that drives said sled adjustment system further comprises:
- a unit that determines an eccentricity component of said optical disk from said tracking drive signal values; and
- a unit that determines, based on said eccentricity component, at least one of the amount and/or direction to move said sled adjustment system.

10. A control method for an optical disk device that writes on and/or reads from an optical disk information by focusing a light spot from an optical pickup onto the optical disk, and includes a tracking adjustment system that performs tracking adjustment of said optical pickup with respect to said optical disk, a sled adjustment system that adjusts a sled position of said optical pickup, and a control means that controls said tracking and sled adjustment systems, wherein said sled adjustment system and said tracking adjustment system are controlled independently,
wherein said control method comprising:
- an offset value acquisition step that detects at prescribed intervals a tracking drive signal output from said tracking adjustment system and acquires signal values of the tracking drive signal as tracking drive offset values;
- an offset representative value computation step that computes an offset representative value based on multiple tracking drive offset values for one lap of said optical disk that are acquired by said offset value acquisition step;
- an offset value comparison step that compares an offset center value, which is the tracking drive offset value in the state in which no tracking adjustment control is performed, and the offset representative value computed by said offset representative value computation step; and
- a sled drive decision step that decides, based on the comparison result by said offset value comparison step, whether to drive said sled adjustment system.

11. A control method according to claim 10, wherein said optical disk device further comprising a rotation adjustment system that performs rotation adjustment of a spindle motor that rotates the optical disk,
wherein said offset value acquisition step has a rotation drive signal monitoring step that monitors the rotation drive signal output from said rotation adjustment system.

12. A control method according to claim 10, wherein said offset representative value computation step computes the offset representative value by adding up multiple tracking drive offset values obtained by said offset value acquisition step and averaging the values that added up.

13. A control method according to claim 12, wherein said sled drive decision step decides whether to drive said sled adjustment system based on a larger-smaller relationship between said offset representative value and said offset center value, and the difference between said offset representative value and said offset center value.

14. A control method for an optical disk device that writes on and/or reads from an optical disk information by focusing a light spot from an optical pickup onto the optical disk, and includes a tracking adjustment system that performs tracking adjustment of said optical pickup with respect to said optical disk, a sled adjustment system that adjusts a sled position of said optical pickup, and a control unit that controls said tracking and sled adjustment systems, wherein said sled adjustment system and said tracking adjustment system are controlled independently,
wherein said control method comprising:
- a step that detects at prescribed intervals the tracking drive signal output from said tracking adjustment system; and
- a step that drives said sled adjustment system based on the value of said detected tracking drive signal.

15. A control method according to claim 14, wherein the step that drives said sled adjustment system further comprises:
- a step that determines an average value of said tracking drive signal values;
- a step that determines a difference value between said average value and a prescribed standard value; and
- a step that determines, according to said difference value, at least one of the amount and/or direction to move said sled adjustment system.

16. A control method according to claim 14, wherein the step that drives said sled adjustment system further comprises:
- a step that determines an average value of said tracking drive signal values;
- a step that determines a difference value between said average value and a prescribed standard value; and
- a step that determines, according to said difference value, whether to move said sled adjustment system.

17. A control method according to claim 14, wherein the step that drives said sled adjustment system further comprises:

a step that determines an eccentricity component of said optical disk from said tracking drive signal values; and a step that determines, based on said eccentricity component, at least one of the amount and/or direction to move said sled adjustment system.

18. A recording medium storing a program, which is readable and executable by computer, for controlling an optical disk device that writes on and/or reads from an optical disk information by focusing a light spot from an optical pickup onto the optical disk, and includes a tracking adjustment system that performs tracking adjustment of said optical pickup with respect to said optical disk, a sled adjustment system that adjusts a sled position of said optical pickup, and a control means that controls said tracking and sled adjustment systems, wherein said sled adjustment system and said tracking adjustment system are controlled independently, wherein said program comprising:

an offset value acquisition step that detects at prescribed intervals a tracking drive signal output from said tracking adjustment system and acquires signal values of the tracking drive signal as tracking drive offset values;

an offset representative value computation step that computes an offset representative value based on multiple tracking drive offset values for one lap of said optical disk that are acquired by said offset value acquisition step;

an offset value comparison step that compares an offset center value, which is the tracking drive offset value in the state in which no tracking adjustment control is performed, and the offset representative value computed by said offset representative value computation step; and a sled drive decision step that decides, based on the comparison result by said offset value comparison step, whether to drive said sled adjustment system.

* * * * *